March 22, 1949.

C. E. BEWALDA 2,464,788

APPARATUS FOR MIXING FINE SOLIDS AND FOR
DISCHARGING UNIFORM PORTIONS THEREOF

Filed Oct. 19, 1946

INVENTOR.
Clarence E. Bewalda
BY

Griswold & Burdick
ATTORNEYS

Patented Mar. 22, 1949

2,464,788

UNITED STATES PATENT OFFICE 2,464,788

APPARATUS FOR MIXING FINE SOLIDS AND FOR DISCHARGING UNIFORM PORTIONS THEREOF

Clarence E. Bewalda, Midland, Mich., assignor to The Dow Chemical Company, Midland, Mich., a corporation of Delaware Application October 19, 1946, Serial No. 704,490

3 Claims. (Cl. 259—30)

This invention relates to apparatus for producing uniform blends of finely divided solid materials, and is concerned primarily with a discharge chute for attachment to and use with such a blender.

It is well known that when two or more free-flowing solid materials are blended, usually in granular or pulverulent form, and an attempt is then made to discharge them from a mixer in a state of constant physical analysis, the fine particles tend to settle, and the physical analysis varies widely between the first and last portions discharged. This trait of such mixtures is commonly objectionable, and is noticed in such diverse fields as the preparation of premixed concrete ingredients, the preparation of insecticidal dusts, and the preparation of pigmented plastic molding powders, to name but a few. In each of the illustrative cases, a critical property of the dry-mix, or of the product to be made from it, is adversely affected by lack of uniformity of the material discharged at intervals from the mixer. Complete, instantaneous discharge of the entire batch of dry-mix from the blender is often impractical or even impossible. For example, it has been found that the mixing of very fine dyes with relatively coarser particles of organic plastic materials, for use in making uniformly colored extruded or molded articles, must take place immediately before the extrusion or molding operation, if the desired uniformity of product is to be approached. It is impossible to mix a series of small batches of plastic and dye and produce a consistent result. The dye and fine particles settle from static large batches. The equipment used in the molding or extrusion operation can hold only a small amount of plastic at a time, unless a large hopper is used, in which case the aforementioned settling and self-classification of the particles may occur to the detriment of the quality of production.

For these and related reasons, it is an object of the present invention to provide an apparatus for blending dissimilar solids, from which the dry-mix may be discharged as needed and conforming to a uniform physical analysis. A further object is to provide a discharge chute for attachment to and use with a dry-mix blender, from which the dry-mix may be discharged in small and uniform lots, as needed for further fabrication or packaging operations. Other and related objects may become apparent from the following description, the annexed drawing, and the appended claims.

The invention consists of an elongated, preferably cylindrical tumbler, rotatable about a horizontally disposed minor (transverse) axis, having attached thereto, and dependent therefrom when the tumbler is in one of its vertical positions, a pocket of controllably variable capacity opening into the tumbler near the periphery thereof, and a chute, opening from near the top of said pocket and extending therefrom usually counter to the direction of rotation of the apparatus, and disposed so as to discharge once in each cycle from its open outer end at that station in the rotary cycle at which said pocket is beneath the tumbler. With such an apparatus, after preliminary but thorough blending of the diverse solid particles making up the mixture being treated, a gate is opened between the tumbler and the pocket. The capacity of the latter is adjusted to hold only the amount of material which it is desired to discharge at one time from the chute. As rotation of the tumbler continues, the uniformity of the mixture therein is maintained. The material which first falls into the pocket is discharged therefrom into the chute and is progressively moved therethrough toward its discharge end as the apparatus moves through its rotary cycle, until the apparatus passes again through its original vertical position, when the particles in the chute are discharged and the pocket is refilled.

Two of the forms of apparatus contemplated by the present invention are illustrated in the accompanying drawing, wherein, Fig. 1 is an elevation, partially in section, of a preferred form of the invention;

Figure 4:
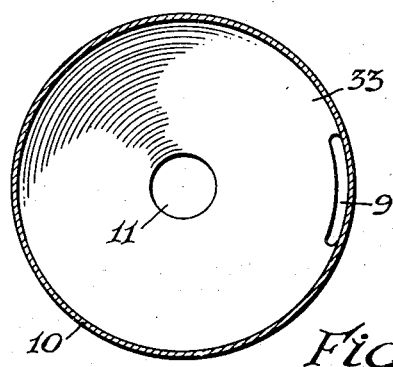
Fig. 4 is a section taken along the line 4—4 of Fig. 1.

Referring first to Figs. 1-4, a cylindrical tumbler 10, fitted with a bottom plate 11 and a cover plate 12, is mounted to rotate on trunnions 13, and may be driven through sprocket 14 and chain 15 by any conventional means, not shown. A cylindrical pocket 16 is connected through coinoidal adapter 17 to tumbler 10, the arcuate connection 9 being made near the periphery of the tumbler, as shown in Fig. 4. Pocket 16 is provided with a pair of internally disposed longitudinal ribs 18 which serve as guides for a sliding plate 19 which may be positioned at any desired distance from the bottom 20 of pocket 16 by means of jack-screw 21, to determine the effective volume of pocket 16 below its point of discharge into chute 22. Baffle 23, located between adapter 17 and chute 22, insures initial delivery of the mixed solids from tumbler 10 to pocket 16, and prevents the return of those solids to tumbler 10 as the apparatus rotates, thus insuring consecutive delivery of measured batches of the dry-mixed solids to pocket 16 and thence to chute 22. As rotation of the apparatus proceeds, the selected volume unit of discharged mixed solids flows by gravity successively through those portions of chute 22 which, in upright stationary position may be termed the transverse leg 22, the ascending reach 24, the traverse section 25, and the descending spout 26. Said spout 26 may be swiveled to any desired position, at flange 27, and, according to the type of discharge desired, may be flared or constricted at the end, or otherwise modified in known manner. A suitable hopper 28 may be provided to receive the material discharged from spout 26, and to funnel that material, if desired, to its point of use, such, for example, as the working barrel of a plastics extrusion or molding machine in appropriate cases.

Figure 5:
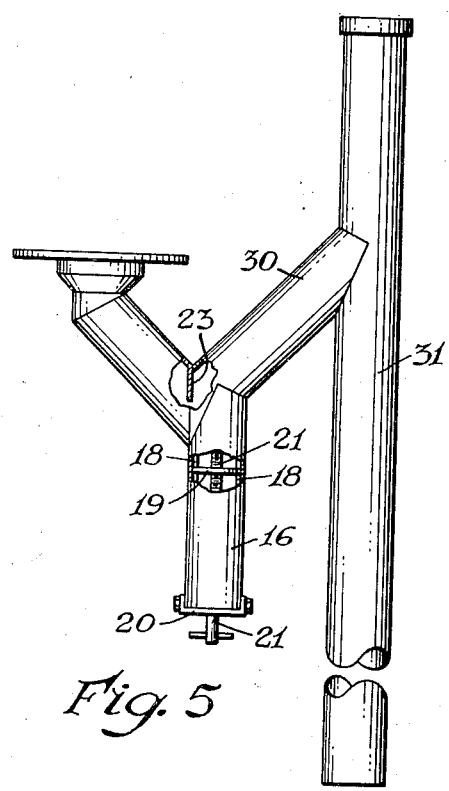
Fig. 5 is an elevation of another form of apparatus within the invention.

A similar result may be obtained with the somewhat less compact modification of the apparatus illustrated in Fig. 5, which should rotate ordinarily, and for best results, with the delivery pipe 31 in a plane vertical to the plane of the drawing. As in the other modification, cylindrical pocket 16 is filled on each rotation of the apparatus while in the lower part of its cycle. Baffle 23 is positioned as shown to direct the flow of dry-mixed solids during rotation of the apparatus. Pocket 16 delivers its load through the pipe 30 to the closed end of pipe 31, from which the solids are discharged when the rotary cycle is complete, in the manner previously described.

For convenience in controlling the amount of solids discharged from tumbler 10 on each rotation, a valve 32, of any suitable type, is inserted between adapter 17 and pocket 16. The amount of material discharged may thus be adjusted to the size of a minimum sample for analysis, or to the full capacity of pocket 16, independently of the rate of rotation of tumbler 10.

It has been found that the apparatus described above accomplishes the desired result of delivering dry-mixed solids of uniform physical analysis, after intimate and thorough mixing has been achieved by initial rotation of the closed tumbler, and until only about 10 to 15 per cent of the original charge remains in the tumbler. When this stage is reached, a tendency is noted for the analysis of the discharged material to vary from the desired constant, with a higher proportion of coarse particles then appearing in the material discharged. This problem may be solved by either of two methods. Thus, when the analysis starts to vary, the tumbler may be filled with a new charge of solids, which may then be mixed, and finally discharged in the desired portions through the discharge chute. The other method of overcoming this problem may be explained with reference to Fig. 1.

Figure 1:
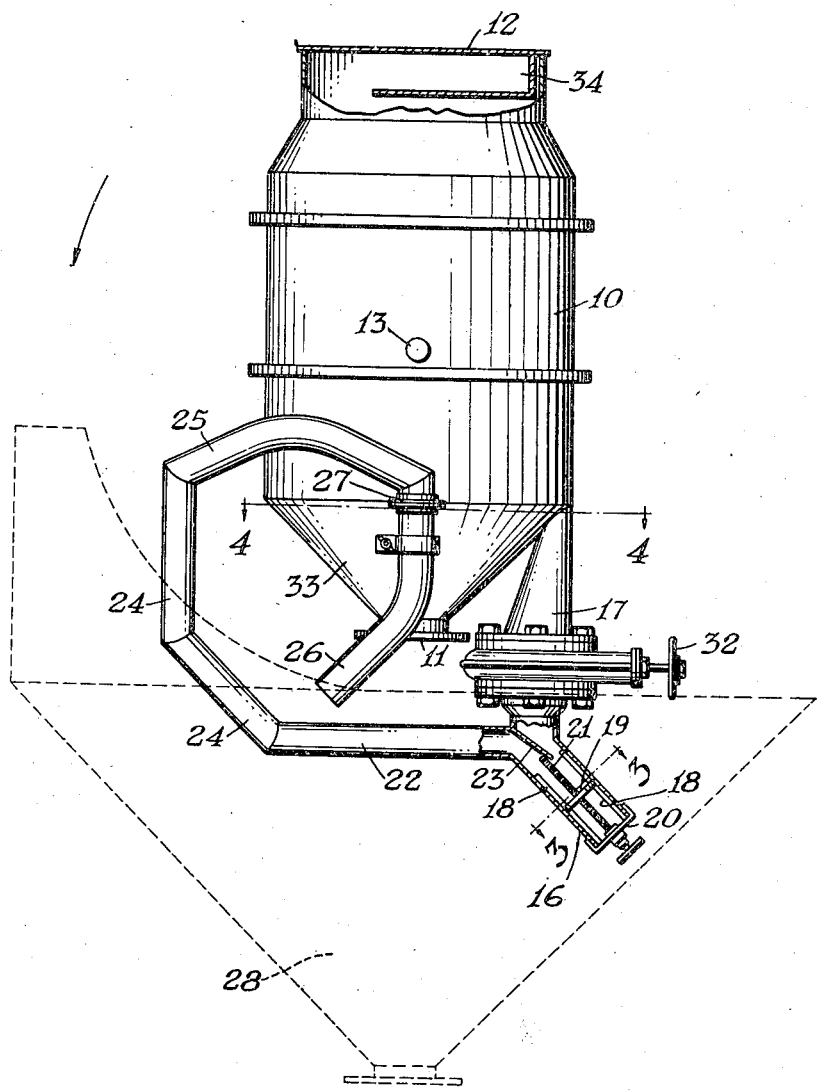
Figure 3:
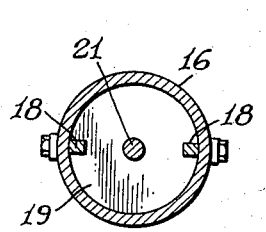
Fig. 3 is a section taken along the line 3—3 of Fig. 1.
Figure 2:
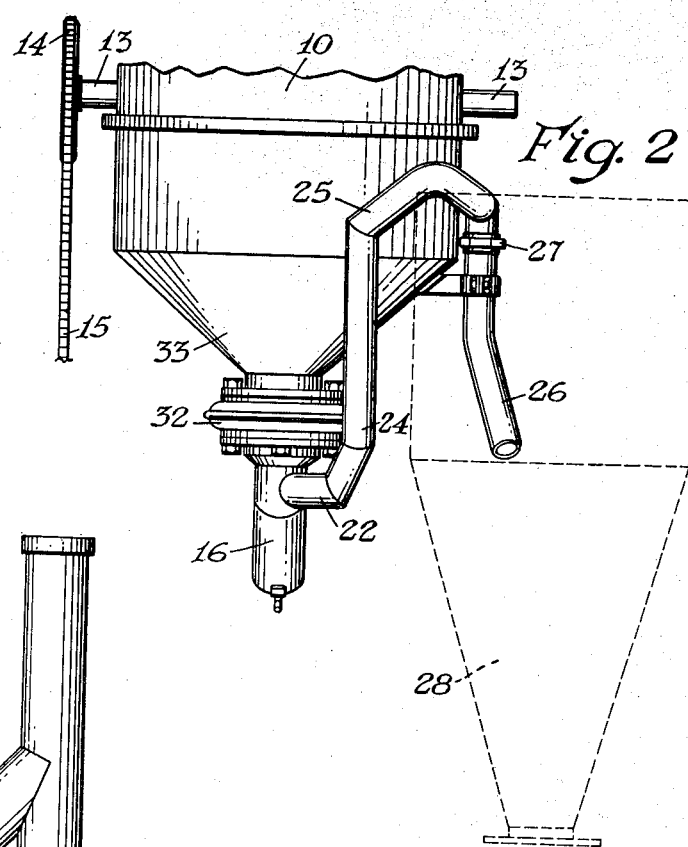
Fig. 2 is a similar elevation of the apparatus of Fig. 1, in a vertical plane at right angles to that of Fig. 1.

In Fig. 1, the tumbler 10 is a cone-bottom vessel, and adapter 17 is attached near the periphery of the cylindrical wall of tumbler 10, in the side of cone 33. It has now been found that a receptacle 34 may be attached to or installed in tumbler 10 at or near a point opposite the point of attachment of adapter 17 on the diameter of rotation of tumbler 10, i. e. with its opening at the far end of the tumbler and at the opposite side from said adapter. Receptacle 34 may have a capacity of from 10 to 20 per cent of the volume of solids normally charged into the tumbler 10. As rotation of the so-modified apparatus proceeds, solids which fall into receptacle 34, as the latter reaches the nadir point in its cycle, are emptied again into tumbler 10 as receptacle 34 passes its zenith, but fall into the cone bottom 33 when tumbler 10 is nearly empty, and cannot fall into adapter 17. Hence, in practice with this modification of the apparatus, it is possible to discharge dry-mix solids through spout 26 (or 31), until no further material is released from tumbler 10, without significant variation in the analysis of the discharged solids. When the apparatus is thus apparently "empty," it still contains the 10 to 15 per cent or so of its initial charge which might otherwise begin to show a tendency toward classification. Rotation may be stopped, a new charge introduced, and, after necessary tumbling, the delivery of portions of the dry-mix may be resumed, without encountering a change in the analysis of the discharged product.

The efficiency of the apparatus in accomplishing its intended purpose may be illustrated by the following example.

About 300 pounds of polystyrene "fines," consisting of particles with a nominal diameter of 0.0625 inch, and 0.2 ounce of a Sudan Blue dye (a very fine powder, passing 100 mesh) were charged into the apparatus illustrated in Fig. 1, but without receptacle 34. The batch was tumbled at 4 R. P. M. for 20 minutes before valve 32 was opened to permit some of the material to be discharged on each rotation of the tumbler. Theoretical analysis, based on the initial charge, is 0.00417 per cent dye. Actual analyses of samples taken after pre-mixing, are given below:

| Time, Hours | Per Cent Dye |
|---|---|
| 0 | .00420 |
| 1 | .00434 |
| 2 | .00441 |
| 3 | .00420 |
| 8 | .00443 |

The average analysis of the samples tested showed a dye content of 0.00432 per cent, and the maximum deviation from this value was only 2.5 per cent. The extreme deviation from the theoretical analysis was less than 6 per cent. The run was discontinued while about 15 per cent of the original charge remained in the tumbler, as the analysis started to vary beyond acceptable limits. In similar runs made in apparatus modified to include receptacle 34, as previously described, the process is run continuously until no more product is discharged, with analyses as consistent as those reported above continuing to the end, and from batch to batch.

Both illustrated modifications of the apparatus comprise a tumbler, as described, and a hollow or tubular modified Y-form measuring and discharge system. In both embodiments, one arm of the Y is attached to the tumbler and the other connects with the discharge chute itself, while the stem of the Y is, in each case, the measuring cup or pocket 16. In each case, the solids fall through one arm of the Y into its stem, and thence, after one-quarter to one-half rotation of the apparatus, through the other arm of the Y into the discharge chute, from which they fall when the cycle of rotation is completed.

I claim:

1. Apparatus for dry-mixing and discharging uniform portions of discrete solid particles, comprising an elongated cone-bottom cylindrical tumbler rotatable about a horizontally disposed minor axis, and a modified Y-form discharge device opening through one arm of the Y into said tumbler at one side of the conical bottom, the stem of said Y comprising a pocket and adapted to receive dry-mixed solids from the tumbler when at the nadir of its cycle and to deliver said solids through the other arm of the Y before reaching its zenith, said last named arm connecting with a chute positioned to discharge said solids when it and the said pocket again reach the nadir of their cycles, said Y-form discharge device having an internally disposed baffle extending from the crotch toward the stem a distance sufficient to insure that solids which are supplied to the stem from the tumbler through one arm of the Y during rotation of the apparatus are discharged, upon further rotation, through the other arm.

2. Apparatus for dry-mixing and discharging uniform portions of discrete solid particles, comprising an elongated cone-bottom cylindrical tumbler rotatable about a horizontally disposed minor axis, and a modified Y-form discharge device opening through one arm of the Y into said tumbler at one side of the conical bottom, the stem of said Y comprising a pocket of controllably variable capacity and adapted to receive dry-mixed solids from the tumbler when at the nadir of its cycle and to deliver said solids through the other arm of the Y before reaching its zenith, said last named arm connecting with a chute positioned to discharge said solids when it and the said pocket again reach the nadir of their cycles, said Y-form discharge device having an internally disposed baffle extending from the crotch toward the stem a distance sufficient to insure that solids which are supplied to the stem from the tumbler through one arm of the Y during rotation of the apparatus are discharged, upon further rotation, through the other arm.

3. Apparatus for dry-mixing and discharging uniform portions of discrete solid particles, comprising an elongated cone-bottom cylindrical tumbler rotatable about a horizontally disposed minor axis, and a modified Y-form discharge device opening through one arm of the Y into said tumbler at one side of the conical bottom, the stem of said Y comprising a pocket of controllably variable capacity and adapted to receive dry-mixed solids from the tumbler when at the nadir of its cycle and to deliver said solids before reaching its zenith through the other arm of the Y to a monocyclic helical chute through which said solids may pass in a direction counter to the rotation of the apparatus, the open outer end of said chute being positioned to discharge said solids when it and the said pocket again reach the nadir of their cycles, said Y-form discharge device having an internally disposed baffle plate extending from the crotch toward the stem a distance sufficient to insure that solids which are supplied to the stem from the tumbler through one arm of the Y during rotation of the apparatus are discharged, upon further rotation, through the other arm.

CLARENCE E. BEWALDA.

REFERENCES CITED

The following references are of record in the file of this patent:

UNITED STATES PATENTS

| Number | Name | Date |
| --- | --- | --- |
| 899,549 | Marsh | Sept. 29, 1908 |
| 2,263,118 | Carney | Nov. 18, 1941 |
| 2,310,603 | Tayloe | Feb. 9, 1943 |